(12) United States Patent
Tuzson et al.

(10) Patent No.: US 7,500,624 B2
(45) Date of Patent: *Mar. 10, 2009

(54) METHOD AND SYSTEM FOR STORING CARPET FINES

(75) Inventors: Emily Tuzson, Cleveland Heights, OH (US); Robert McMillin, Houston, TX (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/525,784

(22) Filed: Sep. 22, 2006

(65) Prior Publication Data

US 2007/0045455 A1    Mar. 1, 2007

Related U.S. Application Data

(62) Division of application No. 11/052,634, filed on Feb. 7, 2005, now Pat. No. 7,226,007.

(60) Provisional application No. 60/584,255, filed on Jun. 29, 2004.

(51) Int. Cl.
*B02C 17/00* (2006.01)
*B02C 25/00* (2006.01)

(52) U.S. Cl. ..................... 241/24.1; 241/30

(58) Field of Classification Search ..... 241/24.1–24.31, 241/47, 65, 79; 209/11, 21, 30–31
See application file for complete search history.

(56) References Cited

U.S. PATENT DOCUMENTS

| | | | |
|---|---|---|---|
| 3,848,813 | A | 11/1974 | Stanczyk et al. |
| 4,517,905 | A | 5/1985 | Chastain et al. |
| 4,589,355 | A | 5/1986 | Chastain et al. |
| 5,284,103 | A | 2/1994 | Hand et al. |
| 5,423,891 | A | 6/1995 | Taylor |
| 5,535,945 | A | 7/1996 | Sferrazza et al. |
| 5,681,952 | A | 10/1997 | Sifniades et al. |
| 5,859,071 | A | 1/1999 | Young et al. |
| 6,945,484 | B1 * | 9/2005 | Terzini et al. .......... 241/23 |

* cited by examiner

*Primary Examiner*—Faye Francis

(57) ABSTRACT

Fabric material having a backing, such as carpet, is used as a biomass fuel component. The fabric material is shredded and substantially separated into constituent backing and fabric components. The backing component is stored in a first storage unit. The fabric component may be mixed with another biomass fuel component before introduction into a gasifier. The gasifier produces synthetic gas, which is subsequently used to produce steam. The hot ash generated as a by-product of gasification is stored in a second storage unit. Each waste product may be confined to a distinct waste path such that the waste products remain isolated from each other, at least until the ash cools down to approximately the melting point of the backing component.

5 Claims, 5 Drawing Sheets

METHOD AND SYSTEM FOR STORING CARPET FINES

RELATED APPLICATIONS

This application is a divisional of application Ser. No. 11/052,634, filed Feb. 7, 2005, now U.S. Pat. No. 7,226,007 which claims the benefit of the filing date under 35 U.S.C. §119(e) of Provisional U.S. Patent Application Ser. No. 60/584,255 filed on Jun. 29, 2004, the contents of which are hereby incorporated by reference herein in their entirety.

FIELD OF THE INVENTION

The present invention relates generally to the production of energy. More particularly, the invention relates to a method and system for storing and using carpet scrap in a thermal conversion process.

BACKGROUND OF THE INVENTION

Carpet manufacturers currently dispose of industrial carpet remnants as waste at landfills. Carpet distributors and carpet installation contractors typically also dispose of used post-consumer carpet as waste at landfills. Hence, the amount of waste being deposited in landfills may be voluminous and can create a strain on the landfill resources presently available. Additionally, landfills in general are not aesthetically pleasing or environmentally beneficial. The carpet waste may be manually recycled by hand by segregating the waste to reclaim any recyclable pieces, but the amount of carpet reclaimed may be limited and only a minimal percentage of the total waste carpet may be useful. Accordingly, there is a need for efficient recycling of carpet waste to reduce the amount of waste being disposed of at landfills.

Additionally, carpet manufacturers use steam, electricity or other energy sources in their manufacturing processes. Energy may be purchased directly (electricity, for example) or produced from a number of processes and energy sources, such as coal or natural gas (steam, for example). However, conventional energy production processes may be relatively inefficient and/or environmentally unfriendly.

BRIEF SUMMARY

The present invention provides a method and system for the separation and storage of waste products generated through a thermal conversion process. The present invention may permit a significant amount of waste carpet material to be recycled and used as a biomass fuel, and while separating and storing a reusable raw material that the carpet manufacturer typically uses. In a method for storing waste products generated through a gasification process, a fabric material having a backing is separated into constituent fabric and backing components. The backing component is stored in a first storage unit-as a first waste product, and the fabric component is delivered to a gasifier for use as a biomass fuel. A gasification process may produce synthetic gas and generate hot ash as a by-product. The ash may be stored in a second storage unit as a second waste product. The waste products may be isolated from each other to allow individual reuse of either material as is most beneficial or isolated for a sufficient period of time, such that the different types of waste products remain separated until the temperature of the ash decreases to or below the melting point of the first waste product.

For example, a typical carpet structure includes woven fiber material affixed to a backing. Initially, waste carpet may be separated into carpet fibers and carpet fines (backing). The carpet fines may be moved within a first waste product stream and stored within a first storage unit. The carpet fibers may be used as a biomass fuel by a gasifier. A second biomass fuel component that could be higher in moisture content but does not require resizing such as wood pellets, wood chips, wood flour, sawdust or agricultural litter, also may be added to the carpet fibers before introduction into the gasifier. Gasification may produce synthetic gas, used to ultimately generate steam, electricity or other usable heat, and generate hot ash as a by-product. The ash may be moved within a second waste product stream and stored within a second storage unit. The second waste product stream may be distinct and isolated from the first waste product stream such that the ash and carpet fines remain separated from each other, at least until the hot ash cools to or below the melting point of the carpet fines.

In a system for storing waste products generated through a gasification process, a fabric material having a backing may be separated into constituent fabric and backing components by a separator. The backing component may be stored in a first storage unit. A gasifier may use the fabric component to produce synthetic gas and generate ash as a by-product. The ash may be stored in a second storage unit. The first and second storage units may each be part of distinct waste product stream such that the individual waste products generated may be isolated from each other and therefore available for beneficial reuse, or isolated for sufficient time to allow safe mixing of the waste product streams and therefore greatly reducing landfill requirements.

In a system for storing waste carpet products, a shredder shreds, cuts, or sizes carpet, a separator separates the sized or shredded carpet into carpet fibers and carpet backing, a first storage unit stores the carpet backing, a gasifier uses the carpet fibers to produce synthetic gas and generate ash as a by-product, and a second storage unit stores the ash. The first and second storage units may each be part of a distinct waste product path such that the individual waste products generated are separated at some point in time.

Advantages of the present invention will become more apparent to those skilled in the art from the following description of the preferred embodiments of the invention which are shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

Figure 1:
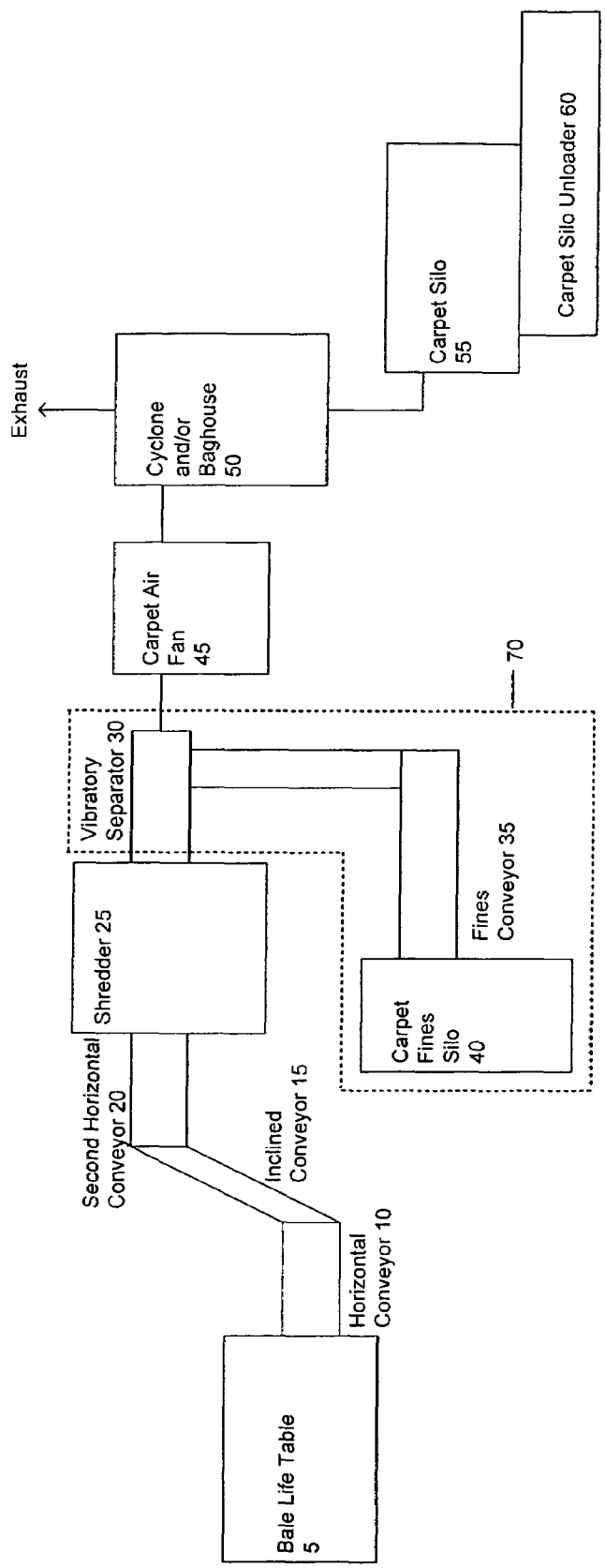
FIG. 1 is a schematic illustration of one embodiment of a first stage of a system for storing waste products generated through a gasification process.

Methods and systems for storing waste products generated through a thermal conversion process, such as gasification, are provided. The process of gasification may be used to generate steam, such as application steam for use by turbines.

Gasification is the thermal conversion of a solid biomass fuel into a hot (over 1,000° F.) synthesis gas that contains combustible gases such as methane, hydrogen, carbon monoxide, and/or other gases. In the process of gasification, or the conversion of a solid biomass fuel into a gas, there may be an insufficient amount of oxygen to completely burn the biomass.

The purpose of gasification and the resultant process conditions are significantly different than the purpose and operating conditions of an incinerator. In an incinerator, the intent is to totally burn the solid feed within the confines of the incinerator. On the other hand, the intent of gasification is to produce a gas for use external to a gasifier, as well as controlling the gasifier emissions to improve any impact on the environment. Additionally, ash generated from gasification as a by-product that is subsequently disposed in an engineered landfill may be biologically inert depending upon which gasification process is used, or at least not a significant source of toxins. Gasification results in significant material reduction, such that required landfill space is reduced. Accordingly, the process of gasification may have multiple environmental benefits.

A fabric material having a backing, such as carpet, may be used as a biomass fuel for gasification. The term "carpet" encompasses any item that has been manufactured from at least two different types of material, one material being a fabric or other covering and another material being a synthetic material, such as rubber or a polymer. For instance, carpet in this context may include standard floor carpet, floor mats, wall coverings, rugs, and the like, as well as industrial carpet waste and segregated, used post-consumer carpet waste.

Carpet waste may be provided to the system in the form of bales. In general, bales are the end product of a compaction process that is used to decrease the volume that a material occupies by increasing the density and weight. Bales are typically bound with bands or wire to keep the baled material from separating. Bales may be either rectangular, square, or round. Baled carpet may enhance the ease of the delivery and movement of the waste carpet. Landfill owners and/or operators may also provide incentives for baling of carpet to reduce the volume requirement of the landfill. Alternatively, the carpet is loose or not compacted.

The carpet waste may be shredded and substantially or mostly separated into carpet fines and carpet fibers. The carpet fines may have value as a raw material to the carpet manufacturer, and the carpet fines are detrimental to a gasification process since there is little available heating value. Therefore, the removal and storage of carpet fines may have economic, environmental and/or process efficiency value. The primarily carpet fines may be moved within a first waste product stream to a first silo for storage. The primarily carpet fibers may be used as a biomass fuel, either alone or mixed with another biomass fuel component. The biomass fuel may be utilized by a gasifier to produce synthetic gas and generate hot ash as a by-product. Subsequently, the synthetic gas may be used to produce electricity, such as via either a combustion turbine or a synthetic gas burner and a boiler.

The ash produced from gasification may be moved within a second waste product stream to a second silo for storage. The first and second waste product streams may be distinct such that the primarily carpet fines, isolated to the first waste product stream, and the ash, isolated to the second waste product stream, remain separated at least until the ash cools down to approximately the melting point of the carpet fines.

Using carpet waste as a biomass fuel for gasification may produce a number of benefits. For example, the use of waste carpet to generate application steam may reduce reliance upon other sources of energy, such as coal and natural gas, which are limited in supply. Moreover, expending a significant portion of waste carpet as a fuel during gasification may reduce the total volume of waste carpet products that ultimately are deposited in landfills. Therefore, the present invention may provide environmental benefits that conventional steam generation processes or carpet disposal methods lack.

FIG. 1 is a schematic illustration of a first stage of a system for storing waste products generated through a gasification process. The first stage may include a bale prep lift table 5, a first horizontal conveyor 10, an inclined conveyor 15, a second horizontal conveyor 20, a shredder 25, a vibratory separator 30, a fines conveyor 35, a carpet fines silo 40, a carpet air fan 45, a cyclone and/or baghouse 50, a carpet silo 55, a carpet silo unloader 60, and a first gasification waste product stream 70. The first stage of a system for storing waste products may have other configurations, including those with fewer or additional components.

As shown in FIG. 1, the bale prep lift table 5 may be the point at which the baled carpet is initially placed. The bale prep lift table 5 may serve to raise the heavy carpet bales up to the height of a first conveyor. In one embodiment, the bale prep lift table 5 may be a heavy duty lift table having the ability to accept forklift fed bales of carpet trim, allow manual removal of the bale wires/bands, and subsequently lift the bales onto the shredder infeed conveyor 10.

The first horizontal conveyor 10, the inclined conveyor 15, and the second horizontal conveyor 20 may be provided as a mechanical conveyance system to deliver and position the carpet bales appropriately for movement into the shredder 25. The bale belt conveyor system comprising the first horizontal conveyor 10, the inclined conveyor 15, and the second horizontal conveyor 20 may be approximately 38 feet in length and 7 feet in width, but other dimensions also may be used. The bale belt conveyor system may generate a carpet flow rate up to approximately 5,500 lb/hr with an average density of approximately 3.5 lb/ft$^3$, but greater or lesser rates also may be used. The system may be intended to be operated at a carpet flow rate delivering approximately 4,500 lb/hr or other rates.

The shredder 25 may break up the bales of carpet and cut the carpet into small pieces. The shredder 25 may either shred, tear, cut, or grind the fabric material to reduce the size of the pieces of fabric material. In one embodiment, the shredder may cut the carpet into pieces approximately one square inch in size. For example, the shredder may be a Granutech-Saturn Rotogrind model M240 shredder. However, other types of devices capable of "sizing" or reducing the size of the pieces of fabric material by shredding, cutting, tearing, or grinding also may be used.

During the process of shredding or sizing the carpet, which may include shredding, cutting, tearing, or grinding the carpet, the carpet backing or fines may become substantially or mostly separated from the carpet fibers. Subsequently, the shredded carpet may be directed to the vibratory separator 30. The vibratory separator 30 may be a hooded vibratory separator. The vibratory separator 30 may separate the majority of the carpet fines from the majority of the carpet fibers. After separation of the majority of the carpet fines from the majority of the carpet fibers, the system may convey the primarily carpet fines via the fines conveyor 35 to a first storage unit. The primarily carpet fines may be stored at the carpet fines silo 40. In one embodiment, the carpet fines silo 40 may have a storage capacity of approximately 2200 ft$^3$, but other volumes also are possible. In another embodiment, the fines conveyor 35 may provide a maximum fines flow rate of approximately 1,000 lb/hr or other rates. The system may be intended to be operated with a fines flow rate of approximately 360 lb/hr, however, greater or lesser flow rates also may be used.

The vibratory separator 30, the fines conveyor 35, and a first storage unit, such as the carpet fines silo 40, may provide the first gasification waste product stream 70. The first gasification waste product stream 70 may be distinct and separate from other gasification waste product streams or paths. The first gasification waste product stream 70 may keep the first gasification waste product from intermingling with other waste products, such as other gasification waste products. In one embodiment, the first gasification waste product may be a backing component of a fabric material having a backing, such as carpet backing or fines.

The carpet air fan 45 may be provided such that primarily carpet fibers are blown from the shredder 25 and/or the vibratory separator 30 through the cyclone or baghouse 50. Hence, the carpet air fan 45 acts like an air conveyor to convey the carpet fibers within the system. Additionally, when the carpet is shredded or sized, a considerable amount of dust may be created. The cyclone or baghouse 50 may capture a large portion of the very fine dust that may be created as a result of shredding or sizing the carpet. The primarily carpet fibers may then be moved to an intermediate storage unit, such as the carpet storage silo 55. The primarily shredded or sized carpet fibers may be stored at the intermediate storage unit. The carpet storage silo 55 may have a storage capacity capable of delivering carpet for approximately four hours at a design flow rate of approximately 4,500 lb/hr, however greater or lesser flow rates also may be used.

Figure 2:
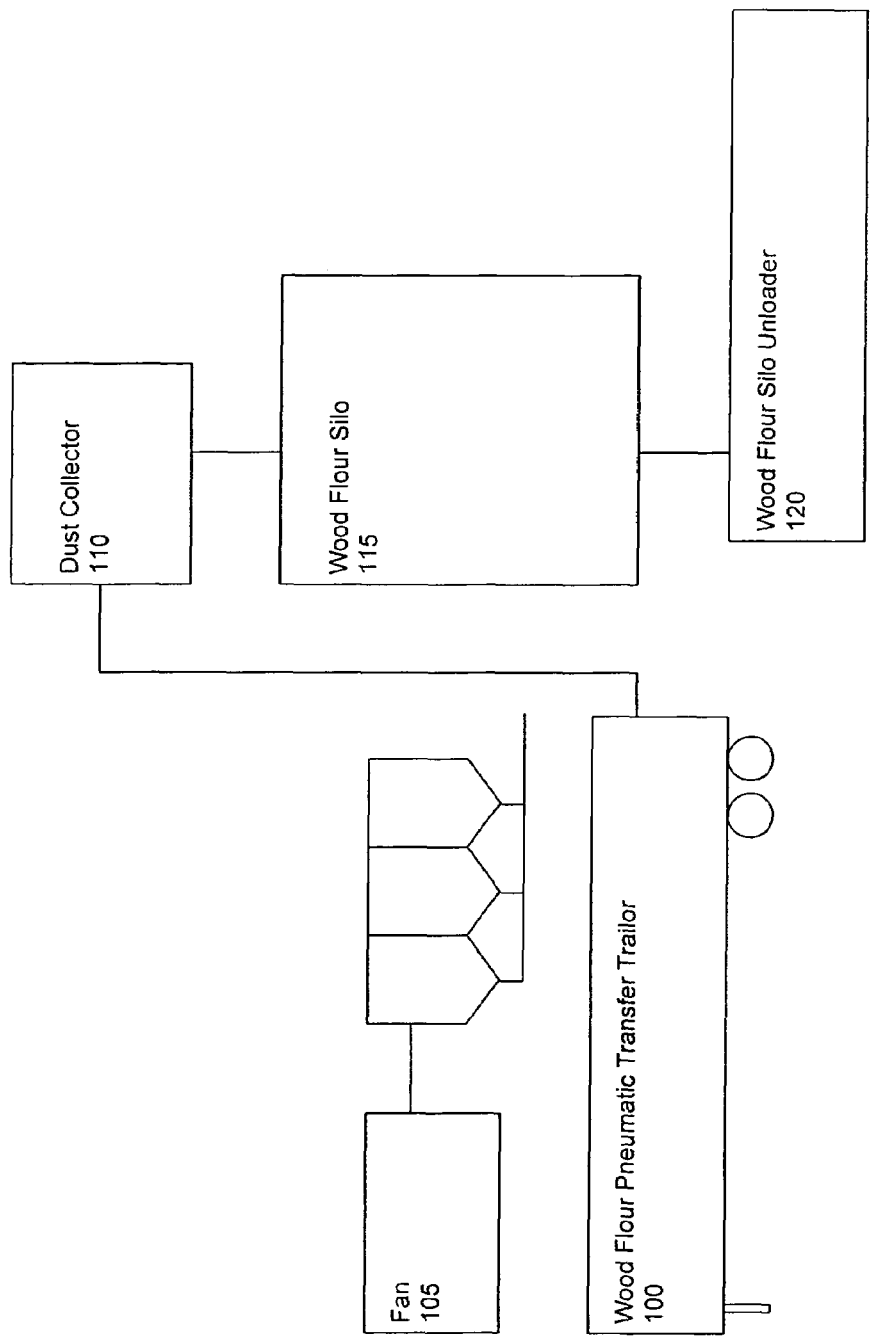
FIG. 2 is a schematic illustration of one embodiment of a second stage of a system for storing waste products generated through a gasification process.

FIG. 2 is a schematic illustration of a second stage of a system for storing waste products generated through a gasification process. The second stage may include a wood flour pneumatic transfer trailer 100, a fan 105, a dust collector 110, a wood flour silo 115, and a wood flour silo unloader 120. The second stage of a system for storing waste products may have other configurations, including those with fewer or additional components.

As shown in FIG. 2, additional biomass fuel components may be stored within the system. In one embodiment, a wood-based biomass fuel component, such as pellets, wood chips, wood flour, or sawdust, may be used. Wood flour is finely pulverized dried wood, typically used as a filler in thermostating molding compounds. The woods used may be resin-free softwoods such as pine, fir and spruce, or even hardwoods. Wood flour is also known as wood meal. Other biomasses also may be used an as additional biomass fuel component.

The wood flour may be provided to the system using any delivery mechanism, such as the wood flour pneumatic transfer trailer 100. The transfer trailer 100 may be provided with the on board air fan 105. The wood flour may be stored within the wood flour silo 115. The wood flour silo 115 is in close proximity to the carpet storage silo 55. The wood flour silo 115 may have a storage capacity capable of delivering approximately 72 hours of wood flour at a design flow rate of approximately 2,000 lb/hr, but other capacities and/or flow rates also may be used. In one embodiment, the wood flour silo 115 may have a storage capacity of approximately 9,600 ft$^3$ but other volumes also are possible.

The wood flour may be moved from the transfer trailer 100 to the wood flour silo 115 by an auger or a conveyor. The transfer trailer 100 may unload the wood flour and deliver it to the auger or conveyor via a standard drive over dump hopper. For example, the dump hopper may include a concrete pit. The dump hopper also may have drive over screening to prevent any material larger than a particular size, such as approximately one inch in diameter, from reaching the discharge auger or conveyor.

When the wood flour is delivered and unloaded, dust may be generated, which may be captured by the dust collector 110. In one embodiment, the discharge auger or conveyor from the truck to the storage silo may provide a wood flour flow rate up to approximately 50,000 lb/hr with an average density of approximately 23 lb/ft$^3$, but other rates and densities also may be provided.

In operation, the carpet silo unloader 60 and wood flour silo unloader 120 may be used to unload the carpet fibers and wood flour (as needed) from their respective storage silos. The carpet fibers and wood flour may be mixed into one biomass fuel composition as they are simultaneously conveyed to a gasifier, as discussed below.

Figure 3:
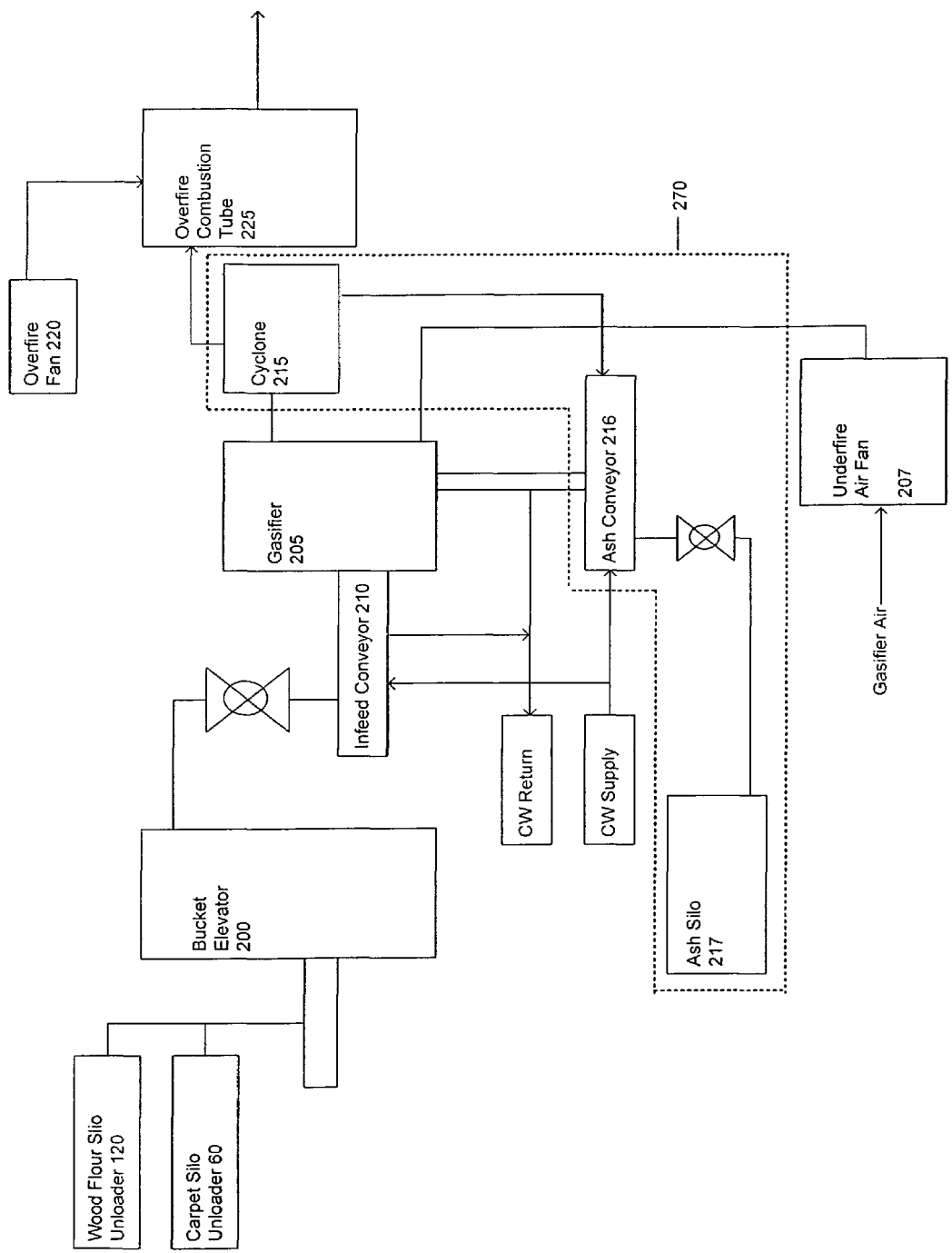
FIG. 3 is a schematic illustration of one embodiment of a third stage of a system for storing waste products generated through a gasification process.

FIG. 3 is a schematic illustration of a third stage of a system for storing waste products generated through a gasification process. The third stage may include a carpet silo unloader 60, a wood flour silo unloader 120, a bucket elevator 200, a gasifier 205, an underfire air fan 207, an infeed conveyor 210, a cyclone 215, an ash conveyor 216, an ash silo 217, an overfire fan 220, an overfire combustion tube 225, and a second gasification waste product stream 270. The third stage of the system for storing waste products may have other configurations, including those with fewer or additional components.

As shown in FIG. 3, the bucket elevator 200 may receive the biomass fuel from at least one unloader. The bucket elevator 200 may receive a fabric component of a fabric material having a backing, such as carpet fibers, from the carpet silo unloader 60, and an additional biomass fuel component, such as wood flour, from the wood flour silo unloader 120, as biomass fuel components.

The bucket elevator 200 may be provided as an inlet to the gasifier 205 at the height of the system's equipment. As shown, the bucket elevator 200 may transport the mixed carpet and, if needed, wood flour to the raised inlet of the gasifier 205. The mixed fuel may be conveyed into the gasifier 205 on the infeed conveyor 210. In one embodiment, for the mixed fuel, the wood flour flow rate may be approximately 1,900 lb/hr with an average density of approximately 23 lb/ft$^3$ and the carpet flow rate may be approximately 3,600 lb/hr with an average density of approximately 3.5 lb/ft$^3$, but other flow rates and densities also may be used.

The biomass fuel may be converted into high temperature synthetic gas in the gasifier 205. The gasifier 205 may receive the biomass fuel from the infeed conveyor 210 and gasifier air from the underfire air fan 207. Gasification of the biomass fuel within the gasifier 205 may produce high temperature synthetic gas and generate hot ash as a by-product. In one embodiment, the gasifier 205 may be a model KC-17 gasifier. In one embodiment, the gasifier 205 may be capable of handling a design biomass feed rate of approximately 5,500 lb/hr for mixed component biomass fuel and approximately 9,200 lb/hr for wood flour only biomass fuel, but other rates or relative rates also may be used.

Many types of biomass having a moisture content of between approximately 0% and approximately 30% may be gasified. For example, it is noted that a wide spectrum of materials such as wood, charcoal, wood waste (saw dust, bark, branches, roots, etc.), as well as agricultural residues, including corn cobs, coconut shells, rice husks, and cereal straws, also may be used as biomass fuel components for gasification.

Moreover, for most biomass fuels, the moisture content depends upon the fuel's type, origin, and treatment before it is used for gasification. Moisture content of the fuel is usually referred to by the inherent moisture plus the surface moisture. Moisture content below approximately 15% by weight is usually desirable to minimize complications and provide economical operation of the gasifier as higher moisture content may reduce the thermal efficiency of the gasifier and result in low gas heating volumes. Additionally, higher moisture content may make it increasingly difficult to convert or gasify the fuel and degrade the gas quality. Therefore, the present invention which produces a higher heating value stream consisting primarily of carpet fibers may be blended with a wetter waste material to provide an acceptable gasifier infeed stream. In one embodiment, the biomass moisture content of the biomass fuel components may be approximately 0.3% for the carpet waste and approximately 9.5% for the wood flour (by weight), but other moisture contents are possible.

The energy content of the biomass fuel may be measured as higher heating values. Fuel with higher energy content is better for gasification. In one embodiment, the carpet biomass fuel component may have a higher heating value of approximately 14,500 btu/lb and the wood flour biomass fuel component may have a higher heating value of approximately 8,500 btu/lb, but other values are possible.

The mineral contents of the fuel which remains in oxidized form after combustion of the fuel is called ash. Ash also may contain some unburned fuel. The ash content and ash composition may impact the smooth operation of the gasifier. Melting and agglomeration of ashes in the reactor may lead to excessive tar formation or complete blockage of the reactor. In general, fuel having ash content below 5% may significantly reduce the occurrence of these types of problems. Ash content varies fuel to fuel. Wood chips typically contain approximately 0.1% ash. Accordingly, in one embodiment, an additional biomass fuel component may be wood based.

As noted above, gasification of the biomass fuel may produce high temperature synthetic gas and generate hot ash as a by-product. As shown in FIG. 3, the high temperature synthetic gas produced from gasification may enter the cyclone 215 after exiting the gasifier 205. The cyclone 215 may be used to separate the ash from the synthetic gas. The ash may exit the bottom of the cyclone 215. After which, the ash may be transported by the ash conveyor 216. The ash conveyor 216 may deliver the ash to a second storage unit, such as the ash silo 217, for storage. The ash silo 217 may have a storage capacity of approximately 5800 ft$^3$, but other capacities may be provided. The ash conveyor 216 may provide a maximum ash removal rate of approximately 2,000 lb/hr, but other rates also may be used. The ash conveyor 216 may be intended to be operated at an ash removal rate of approximately 360 lb/hr.

The ash may be cooled by a cooling system. The cooling system may use cooling water, cold air, or other substances to cool the ash. Alternatively, the cooling system may use fans or blowers. The cooling system may be part of either the ash conveyor 216 or the ash silo 217. FIG. 3 shows one embodiment in which the cooling water is supplied to the ash conveyor 216 to facilitate cooling the ash as it is being transported by the ash conveyor 216.

The cyclone 215, the ash conveyor 216, and a second storage unit, such as the ash silo 217, may comprise the majority of the second gasification waste product stream 270. The second gasification waste product stream 270 may be distinct and separate from any other gasification waste product stream or path, including the first gasification waste product stream 70. The second gasification waste product stream 270 may keep the second gasification waste product isolated from other gasification waste products for a period of time. In one embodiment, the second gasification waste product may be the ash generated as a by-product from gasification. The ash is kept separate from the carpet fines until the ash has been forcefully cooled or allowed to passively cool to or below approximately the melting point of the carpet fines. As mentioned above, the cooling system may forcefully cool the ash to the desired temperature.

The first and second gasification waste product streams 70, 270 may keep the waste products isolated for a period of time for a number of practical reasons. For example, the ash is usually relatively hot, approximately 300° F., at the time it enters a storage unit. Carpet fines typically melt at such a high temperature. Hence, if the ash and the carpet fines are allowed to intermingle while the ash remains hot, the ash may melt a significant amount of the carpet fines. After the hot ash/carpet fines mixture cools, a large block of hardened concrete-like material in the storage unit may result. Furthermore, each of the waste products may have individual value if kept separate. Accordingly, by moving and storing the individual gasification waste products separately, the ability to sell, as well as more easily and cheaply dispose of, each waste product may be improved.

The synthetic gas may be induced from the gasifier 205 by the modulating or overfire fan 220 through an arrangement of mechanisms that cool and scrub the synthetic gas to prepare the gas as a fuel for delivery to either a combustion turbine, a synthetic gas burner, or other components. The synthetic gas may be directed after exiting the cyclone 215 by an overfire combustion tube 225.

Although the above embodiments are described, there are many possible equipment configurations which may be designed and utilized downstream of the gasifier. For example, the synthetic gas produced by the gasifier may be fired in one or two stages and the flue gas directed to a boiler to produce medium or high-pressure steam. The high-pressure steam may then be used to drive steam turbines for the production of electricity. Alternatively, the combustion of cleaned synthetic gas in a combustion turbine also may generate electricity.

Figure 4:
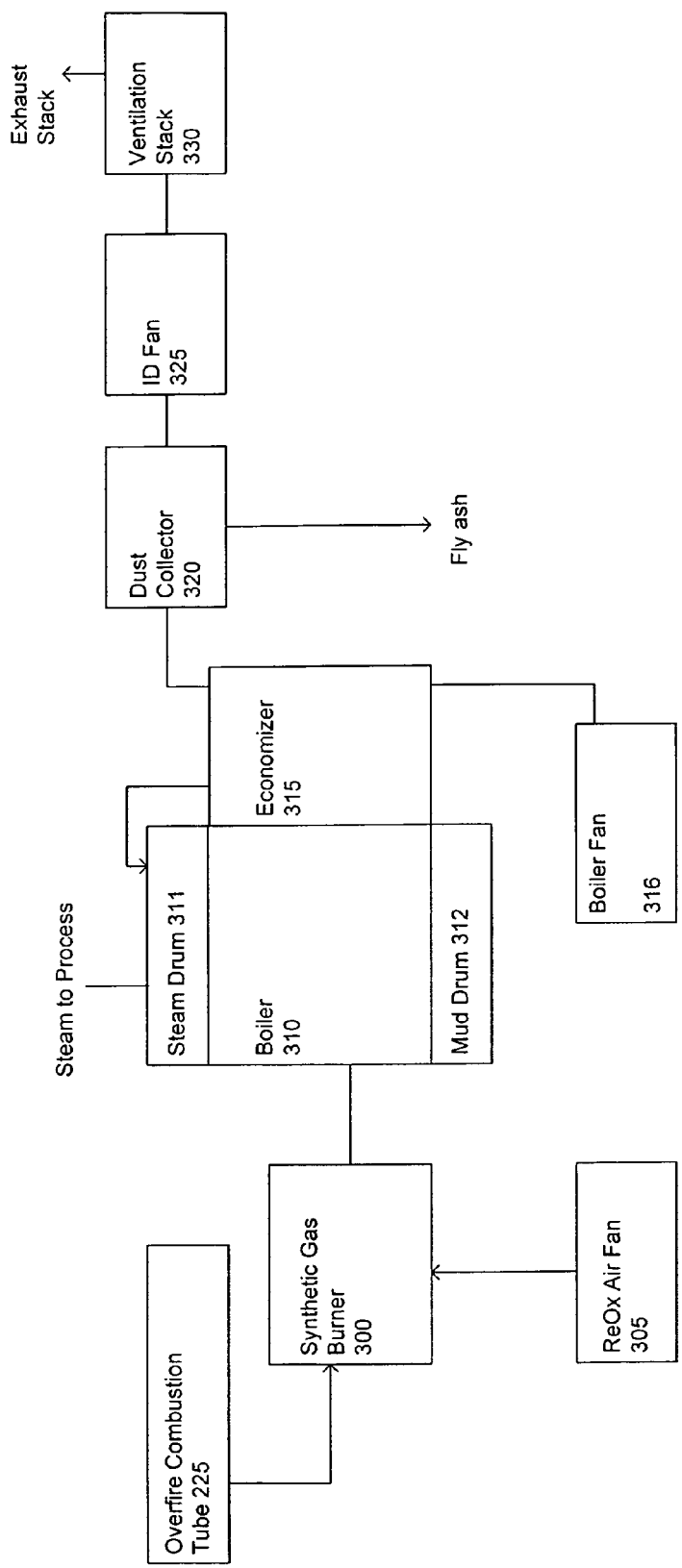
FIG. 4 is a schematic illustration of one embodiment of a fourth stage of a system for storing waste products generated through a gasification process.

FIG. 4 is a schematic illustration of a fourth stage of the system for storing waste products generated through a gasification process. The fourth stage may include an overfire combustion tube 225, a synthetic gas burner 300, a re-oxidation air fan 305, a boiler 310, a steam drum 311, a mud drum 312, an optional economizer 315, a boiler fan 316, a dust collector 320, an induced draft fan 325, and a ventilation stack 330. The fourth stage of the system for storing waste products may have other configurations, including those with fewer or additional components.

As shown in FIG. 4, the overfire combustion tube 225 may direct the synthetic gas to the synthetic gas burner 300. The synthetic gas burner 300 may burn the synthetic gas as a fuel and heat the recovery boiler 310. The re-oxidation air fan 305 may provide combustion air for the burner 300.

The boiler 310 may use the hot gas produced from the burner to boil feedwater and produce steam. The boiler 310 may include the steam drum 311 and the mud drum 312. The boiler 310 may produce 150 psi, 336° F. steam, but other temperatures and pressures also may result. The boiler 310 may have a steam capacity of approximately 50,000 lb/hr, but other capacities also may be provided.

The boiler 310 may include an optional economizer 315 to enhance the overall efficiency of the system. For example, the optional economizer 315 may use the hot stack gases to preheat the boiler feedwater. The economizer 315 may be connected to the boiler fan 316. In one embodiment, 150 psi, 2280° F. feedwater may be boiled to produce application steam. In one application, the steam produced may be used by one or more turbine generators to generate electricity.

Any remaining particulate matter in the exhaust gases may be removed by the dust collector 320. Exhaust boiler gases may be drawn through the optional economizer 315 by the fan 325. The fan 325 may be an open bottom induced draft fan. The exhaust boiler gases may then be exhausted through the exhaust ventilation stack 330.

Accordingly, the amount of air emissions associated with the production of steam is reduced. Additionally, the use of waste carpet as a biomass fuel may provide other environmental benefits. For example, as previously noted, significant value may be extracted from waste carpet in the ultimate form of application steam which may reduce the dependency on other forms of energy, such as coal and natural gas. Due to the reduction in the volume of un-recycled waste carpet, the amount of landfill resources expended on waste carpet disposal may be reduced. Moreover, the disposal of carpet waste products generated from gasification may be easier and less costly. Therefore, the amount of money spent on other fuels currently being used to produce steam is reduced, the landfill costs associated with carpet waste are lowered, and the cost of disposal of gasification waste products is decreased.

Figure 5:
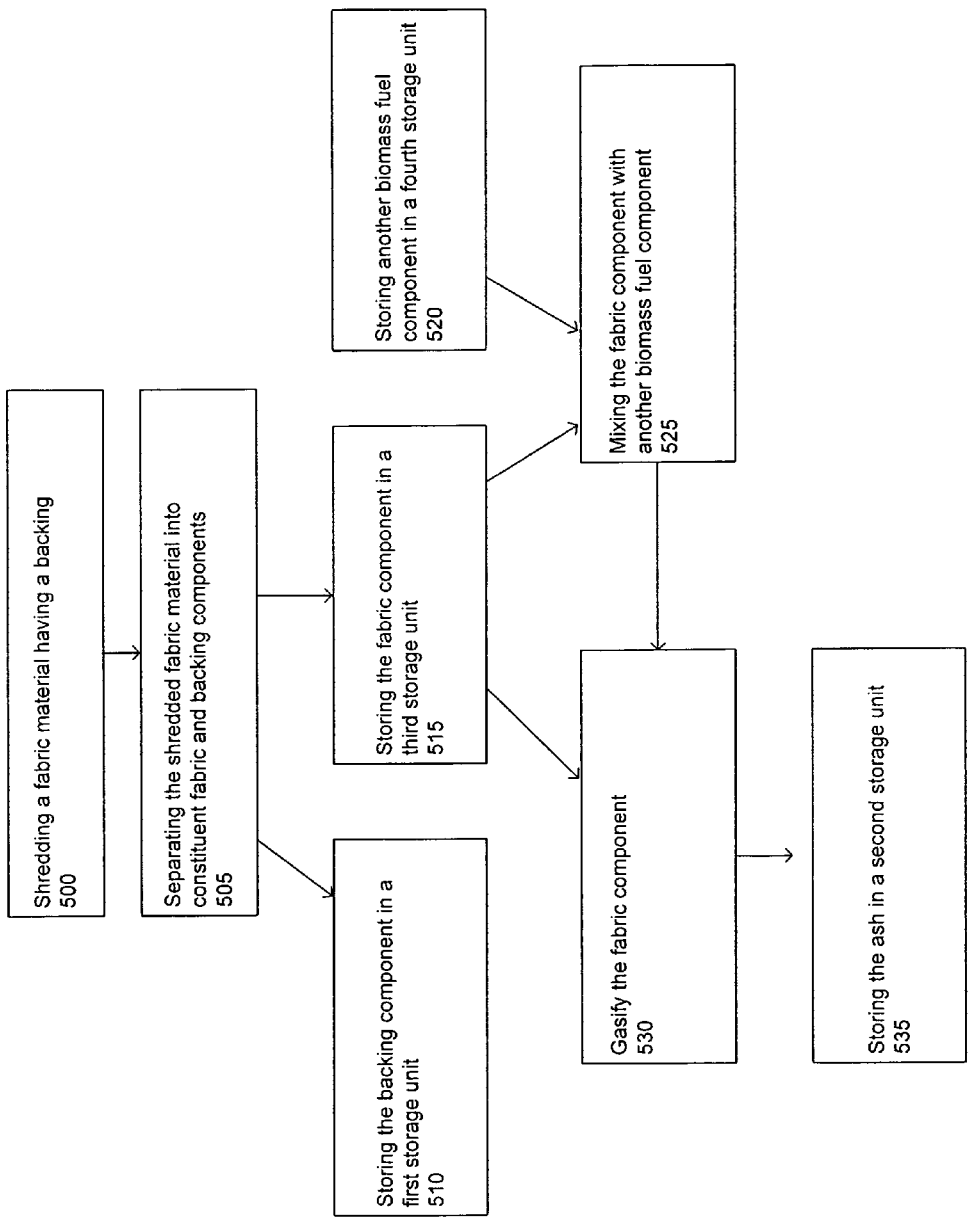
FIG. 5 is a block diagram flowchart of one embodiment of a method for storing waste products generated from a gasification process.

FIG. 5 illustrates a block diagram flowchart of a method for storing waste products generated from a gasification process. The method may include sizing a fabric material having a backing 500, such as by shredding, cutting, tearing, or grinding the fabric material, separating the shredded or sized fabric material into constituent fabric and backing components 505, storing the backing component in a first storage unit 510, storing the fabric component in a third storage unit 515, optionally storing another biomass fuel component fuel component in a fourth storage unit 520, optionally mixing the fabric component with another biomass fuel component 525, gasifying the fabric component 530, and storing the ash generated from gasification as a by-product in a second storage unit 535. The method may have other variations, including those with fewer or additional steps.

In one embodiment, the method may include providing fabric material having a backing, such as carpet, as a biomass fuel for gasification, shredding or sizing the carpet into pieces approximately one square inch in size, and substantially separating or sizing the shredded carpet into primarily carpet fibers and primarily carpet fines, such as by a vibratory separator. Subsequently, the primarily carpet fines may be moved by one or more additional conveyors to a first storage unit and the primarily carpet fibers may be moved to and stored in an intermediate storage unit.

The method may further include providing the separated carpet fibers as a biomass fuel to a gasifier and producing synthetic gas from gasification and generating ash as a by-product. The method also may include moving the ash generated from gasification to a second storage unit, such as a silo. The ash may be moved by at least one additional conveyor. The first and second storage unit may each be part of a distinct waste product path such that the separated carpet fines and ash are isolated from each other for a period of time. As a result, neither waste product is contaminated by or affected by the other waste product, at least until the ash cools to or below the melting point of the carpet fines.

The method may include mixing the separated carpet fibers with one or more additional biomass fuel components before the introduction of the biomass fuel into the gasifier. Any additional biomass fuel component may be pre-sized and not require any cutting or shredding. For example, the available additional biomass fuel components may include agricultural residues or wood-based fuels, such as pellets, wood chips, wood flour, or sawdust. The additional biomass fuel components may be stored in a third storage unit before mixture with the carpet fibers and subsequent introduction into the gasifier.

The method may include cooling and scrubing the synthetic gas produced by gasification, burning the synthetic gas in a burner, and heating a boiler to generate application steam via the burner. The method also may include preheating the boiler feedwater by using an economizer. Alternatively, the synthetic gas may be used by a combustion turbine or another utility to generate electricity.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A method of storing waste carpet products comprising:
   separating a fabric material having a backing into primarily fabric and primarily backing components;
   storing only the primarily backing component, after separation from the primarily fabric component, in a first dedicated storage unit;
   transferring the primarily fabric component, after separation from the primarily backing component, to a gasifier for use as a biomass fuel;
   generating ash as a by-product of gasifying the primarily fabric component in the gasifier;
   storing only the ash generated from gasification in a second dedicated storage unit; and
   maintaining the ash generated from gasification segregated from the primarily backing component until a temperature of the ash decreases to approximately or below a melting point of the primarily backing component.

2. The method of claim 1, the method further comprising, during the transfer of the primarily fabric component from the second dedicated storage unit to the gasifier, mixing the primarily fabric component with another biomass fuel component for gasification of the resultant biomass mixture by the gasifier.

3. The method of claim 2, the method further comprising storing the another biomass fuel component in a separate storage unit prior to being mixed with the primarily fabric component during transfer to the gasifier.

4. The method of claim 1, the method further comprising force cooling the ash generated from gasification.

5. The method of claim 1, the method further comprising storing only the primarily fabric component, after separation from the primarily backing component, in a third dedicated storage unit prior to transferring the primarily fabric component to the gasifier.

* * * * *